US008300383B2

United States Patent
Tsai

(10) Patent No.: US 8,300,383 B2
(45) Date of Patent: Oct. 30, 2012

(54) VARIABLE CAPACITOR

(76) Inventor: Jung-Shih Tsai, Taoyuan County (TW)

( * ) Notice: Subject to any disclaimer, the term of this patent is extended or adjusted under 35 U.S.C. 154(b) by 65 days.

(21) Appl. No.: 13/034,918

(22) Filed: Feb. 25, 2011

(65) Prior Publication Data
US 2011/0211293 A1  Sep. 1, 2011

(30) Foreign Application Priority Data

Feb. 26, 2010  (TW) .................................. 99105538

(51) Int. Cl.
*H01G 5/00*  (2006.01)

(52) U.S. Cl. ..................... 361/288; 361/277; 361/283.1; 361/287; 361/290; 361/292

(58) Field of Classification Search .............. 361/277, 361/288, 283.1, 287, 290, 292; 341/33, 34; 200/600

See application file for complete search history.

(56) References Cited

U.S. PATENT DOCUMENTS

| 3,659,165 A * | 4/1972 | Dome | 361/292 |
| 3,710,209 A * | 1/1973 | Webb et al. | 200/600 |
| 3,965,399 A * | 6/1976 | Walker et al. | 200/600 |
| 4,472,758 A * | 9/1984 | Goto et al. | 200/600 |

* cited by examiner

*Primary Examiner* — Jayprakash N Gandhi
*Assistant Examiner* — Hung Dang
(74) *Attorney, Agent, or Firm* — Ladas & Parry LLP

(57) ABSTRACT

A variable capacitor includes: a dielectric sheet disposed on a substrate and covering an electrode pattern on the substrate; a resilient conductive supporting seat mounted on the dielectric sheet for supporting an insulating operating cap on a central portion thereof; a conductive cover body covering the conductive supporting seat and permitting the operating cap to extend outward; and a biasing member for biasing the central portion of the conductive supporting seat to move away from the substrate. The cover body is connected electrically to the conductive supporting seat and a conductive contact on the substrate. When the operating cap is depressed, the operating cap forces a contact portion of the conductive supporting seat to deform such that a surface area of the deformed contact portion that contacts the dielectric sheet is increased, thereby changing the capacitance between the conductive supporting seat and the electrode pattern.

8 Claims, 6 Drawing Sheets

VARIABLE CAPACITOR

CROSS-REFERENCE TO RELATED APPLICATION

This application claims priority of Taiwanese Application No. 099105538, filed on Feb. 26, 2010.

BACKGROUND OF THE INVENTION

1. Field of the Invention

The invention relates to a capacitor, and more particularly to a variable capacitor.

2. Description of the Related Art

A conventional variable capacitor includes two parallel conductive plates spaced apart from each other and connected pivotally to a pivot axle. During use, one conductive plate is rotated relative to the other conductive plate such that the amount of a plate surface area of each conductive plate which overlaps can be changed. Thus, the capacitance between the conductive plates can be changed, but the conventional variable capacitor may be impractical in some configurations.

SUMMARY OF THE INVENTION

Therefore, an object of the present invention is to provide a variable capacitor having a capacitance that varies in response to compression.

According to the present invention, a variable capacitor comprises:

a substrate having a top surface;

an electrode pattern formed on the top surface of the substrate;

at least one conductive contact formed on the top surface of the substrate and spaced apart from the electrode pattern;

a dielectric sheet disposed on the top surface of the substrate and covering the electrode pattern;

a resilient conductive supporting seat mounted on the dielectric sheet, the conductive supporting seat having a central portion spaced apart from the dielectric sheet, and a contact portion corresponding to the electrode pattern, the contact portion extending downward from the central portion toward the electrode pattern and abutting against the dielectric sheet;

an insulating operating cap supported by the conductive supporting seat and disposed over the central portion of the conductive supporting seat;

a conductive cover body mounted on the substrate, and covering and electrically contacting the conductive supporting seat, the cover body being connected electrically to the conductive contact, and permitting the operating cap to extend outward; and a biasing member disposed between the conductive supporting seat and the dielectric sheet for biasing the central portion to move away from the substrate;

When the operating cap is depressed, the operating cap forces the contact portion of the conductive supporting seat to deform such that a surface area of the deformed contact portion that contacts the dielectric sheet is increased, thereby changing the capacitance between the conductive supporting seat and the electrode pattern.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
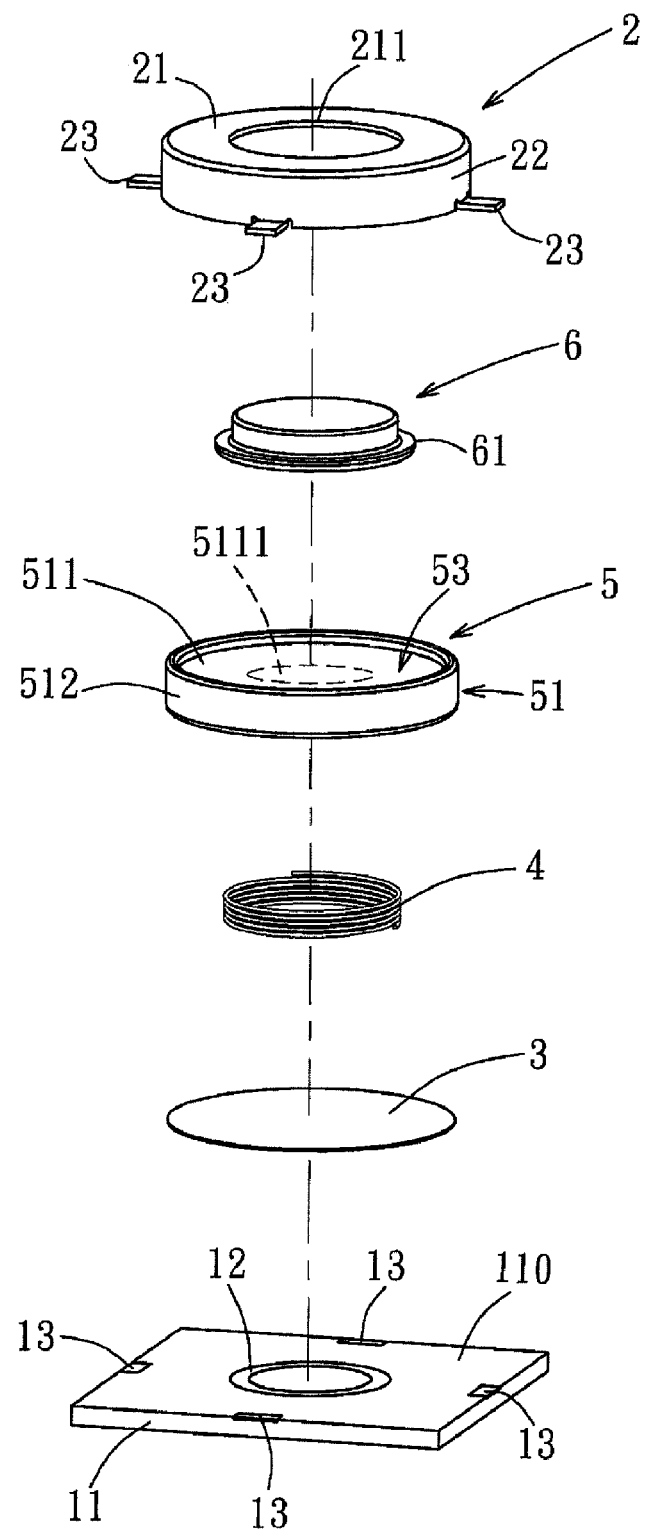
FIG. 1 is an exploded perspective view showing the first preferred embodiment of a variable capacitor according to the present invention.
Figure 2:
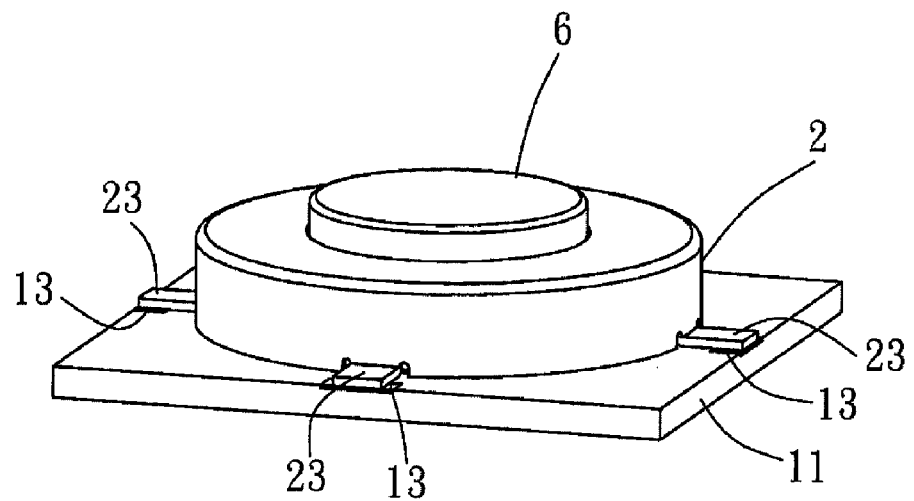
FIG. 2 is a perspective view of the first preferred embodiment.
Figure 3:
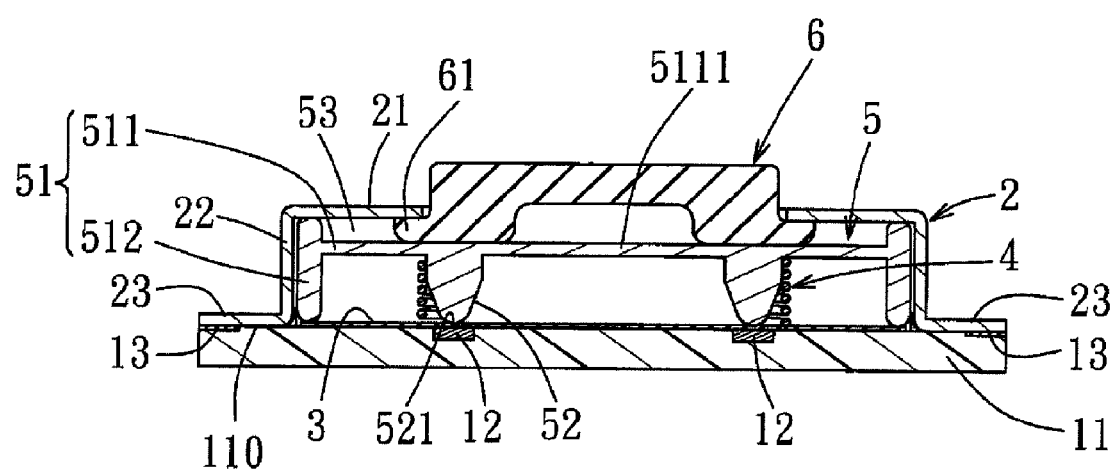
FIG. 3 is a schematic sectional view of the first preferred embodiment.
Figure 4:
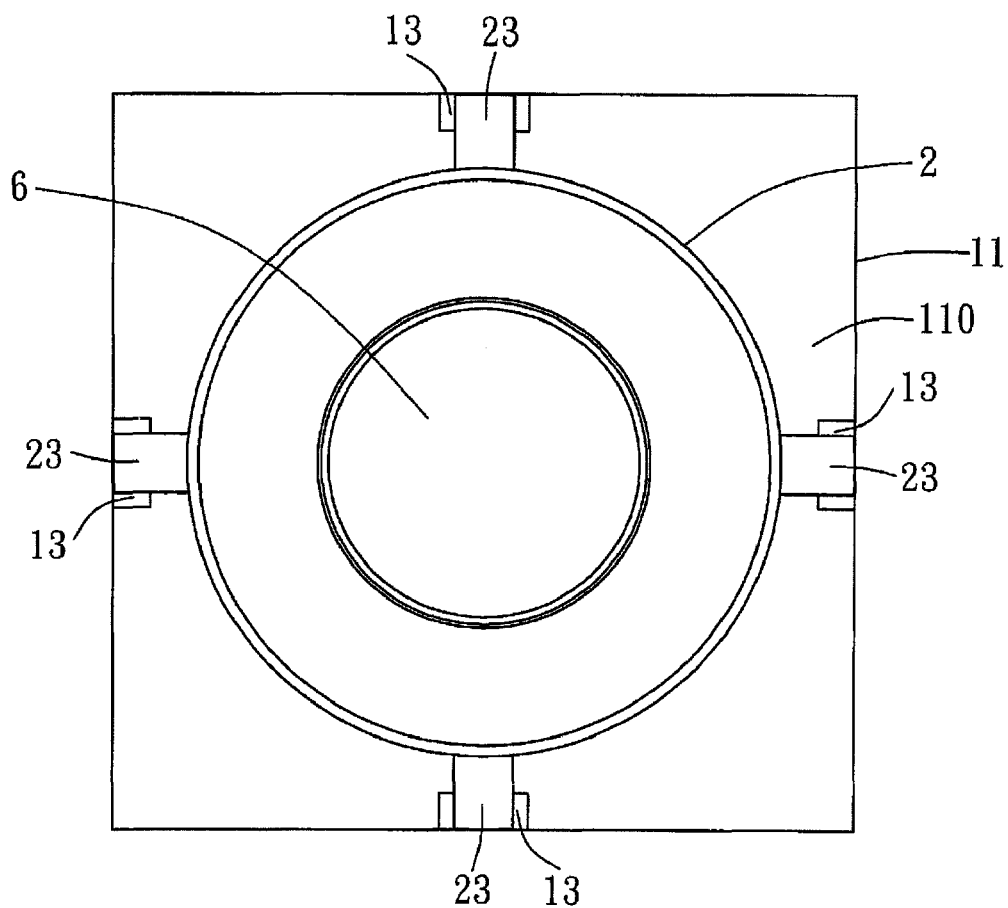
FIG. 4 is a schematic top view of the first preferred embodiment.

Before the present invention is described in greater detail, it should be noted that like elements are denoted by the same reference numerals throughout the disclosure.

Referring to FIGS. 1 to 4, the first preferred embodiment of a variable capacitor according to the present invention is shown to include a substrate 11, an electrode pattern 12, a plurality of conductive contacts 13, a dielectric sheet 3, a resilient conductive supporting seat 5, an insulating operating cap 6, a conductive cover body 2, and a coil spring 4.

The substrate 11 is rectangular and has a top surface 110.

The electrode pattern 12 is ring-shaped, and is formed on the top surface 110 of the substrate 11.

The conductive contacts 13 are formed on the top surface 110 of the substrate 11, and are disposed respectively adjacent to four sides of the top surface 110, and are spaced apart from the electrode pattern 12.

The electrode pattern 12 and the conductive contacts 13 are adapted to be connected electrically to an external circuit (not shown)

The dielectric sheet 3 is disposed on the top surface 110 of the substrate 11, and covers the electrode pattern 12.

Figure 5:
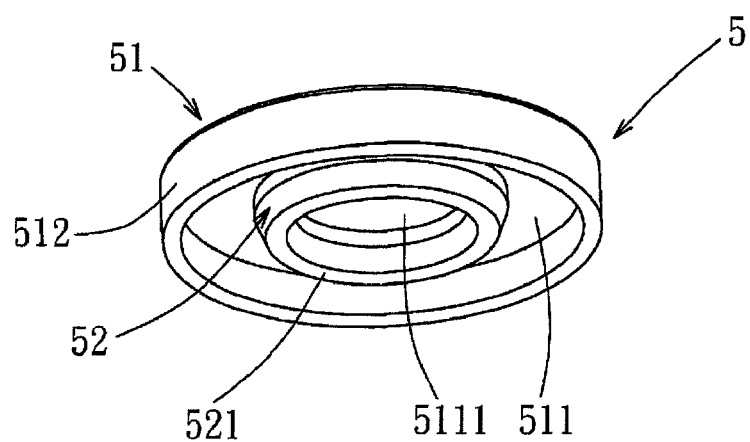
FIG. 5 is a bottom perspective view of a conductive supporting seat of the first preferred embodiment.

Referring further to FIG. 5, the conductive supporting seat 5 is made of a conductive silica gel. The conductive supporting seat 5 is mounted on the dielectric sheet 3. In this embodiment, the conductive supporting seat 5 is a cap and includes a main body 51 and a contact portion. The main body 51 has a circular top wall 511 spaced apart from the dielectric sheet 3, and an annular surrounding wall 512 disposed around the top wall 511 and connected to a periphery of the top wall 511. The annular surrounding wall 512 has an upper portion extending upward from the top wall 511 such that the upper portion of the annular surrounding wall 511 cooperates with the top wall 511 to define a receiving space 53. The contact portion extends downward from a central portion 5111 of the top wall 511 of the main body 51 toward the electrode pattern 12. In this embodiment, the contact portion is in the form of a ring body 52. The ring body 52 has a vertically tapering cross section in a plane that intersects a center of the ring body 52. The ring body 52 has a curved annular bottom surface 521 abutting against the dielectric sheet 3 (see FIG. 3).

The operating cap 6 is made of an insulating material, and is supported by the conductive supporting seat 5. The operating cap 6 is received in the receiving space 53, and is disposed over the central portion 5111 of the top wall 511. The operating cap 6 has an annular rim flange 61.

The cover body 2 is made of a conductive material, and is mounted on the substrate 11. The cover body 2 covers and electrically contacts the conductive supporting seat 5. In this embodiment, the cover body 2 is a cap that has a circular top wall 21 and an annular surrounding wall 22. The top wall 21 contacts electrically the upper portion of the annular surrounding wall 512 of the main body 51 of the conductive supporting seat 5. The top wall 21 is formed with a central opening 211 that permits the operating cap 6 to extend outward. The opening 211 has a diameter smaller than an outer diameter of the annular rim flange 61 such that the annular rim flange 61 is retained in the receiving space 53 in the conductive supporting seat 5. The cover body 2 further has a plurality of connecting pieces 23 extending radially and outward from a lower end of the surrounding wall 22. The connecting pieces 23 are connected electrically and respectively to the conductive contacts 13 by soldering.

The coil spring 4 is disposed between the conductive supporting seat 5 and the dielectric sheet 3, and serves as a biasing member for biasing the central portion 5111 of the top wall 511 of the main body 51 of the conductive supporting seat 5 away from the substrate 11. In this embodiment, the coil spring 4 is sleeved on the contact portion, i.e., the ring body 52. The coil spring 4 has opposite upper and lower ends abutting respectively against the top wall 511 of the main body 51 of the conductive supporting seat 5 and the dielectric sheet 3.

Figure 6:
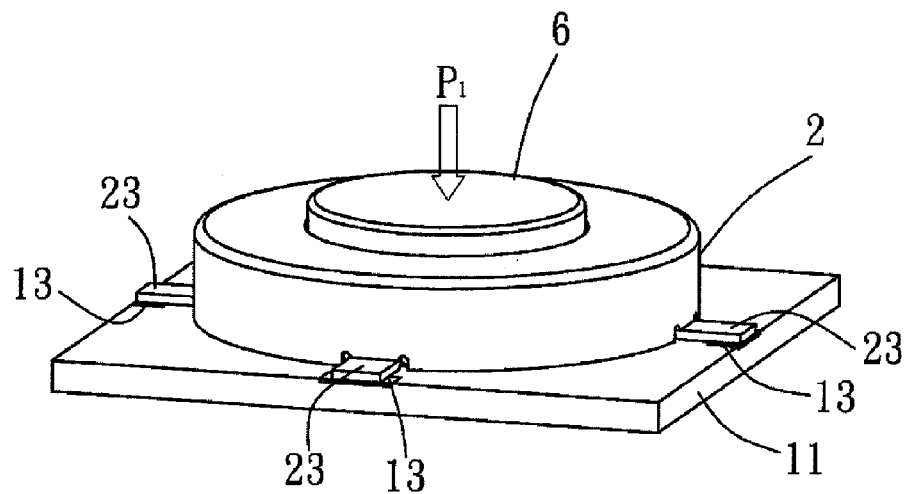
FIG. 6 is a perspective view illustrating the first preferred embodiment when the center of an operating cap is depressed.
Figure 7:
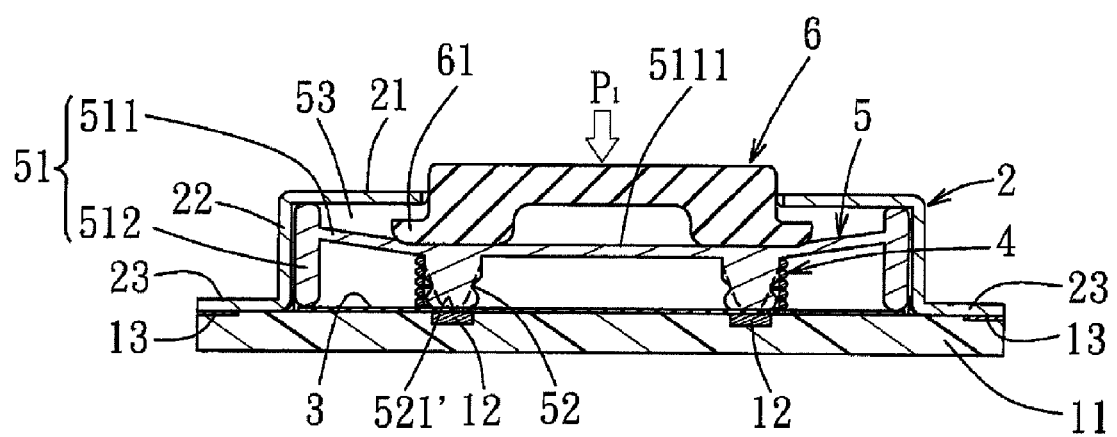
FIG. 7 is a schematic sectional view illustrating the first preferred embodiment when the center of the operating cap is depressed.
Figure 8:
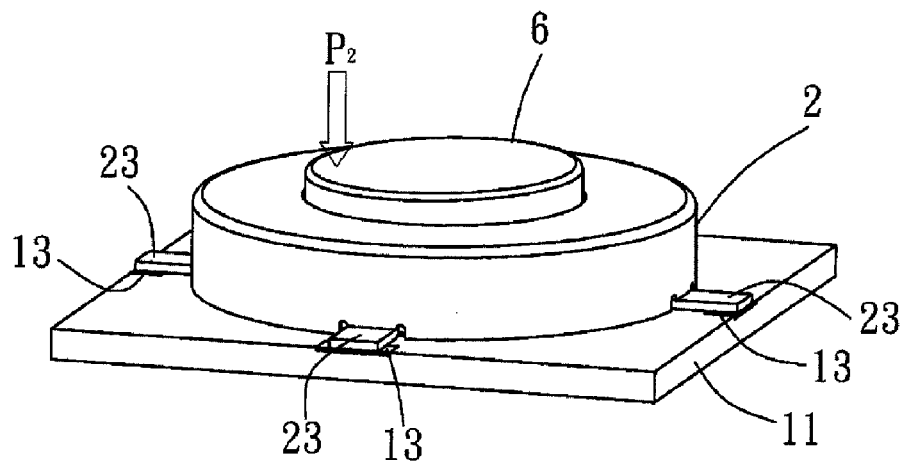
FIG. 8 is a perspective view illustrating the first preferred embodiment when the periphery of the operating cap is depressed.
Figure 9:
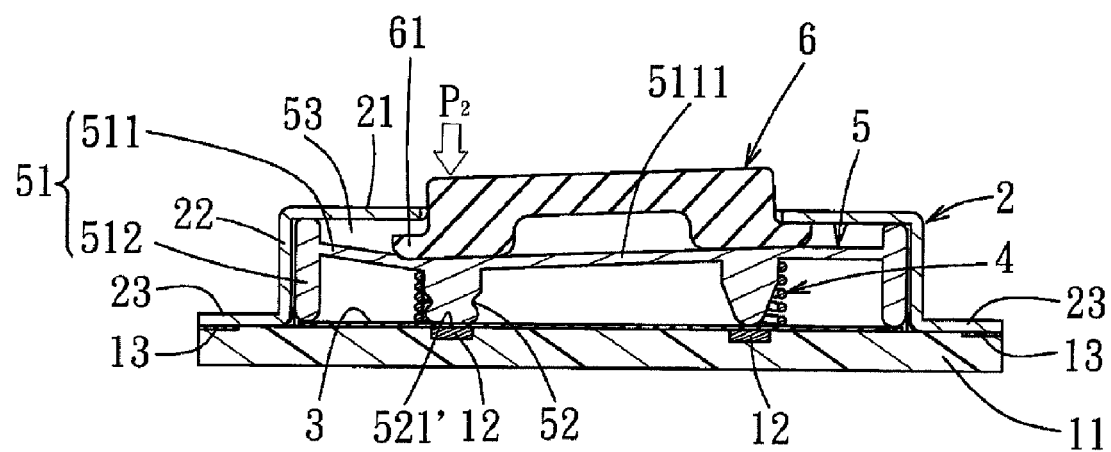
FIG. 9 is a schematic sectional view illustrating the first preferred embodiment when the periphery of the operating cap is depressed.

When the operating cap 6 is depressed, the operating cap 6 forces the contact portion of the conductive supporting seat 5 to deform. For example, FIGS. 6 and 7 illustrate the variable capacitor in an operating state, where the operating cap 6 is depressed by external force ($P_1$) acting on the center of the operating cap 6. FIGS. 8 and 9 illustrate the variable capacitor in another operating state, where the operating cap 6 is depressed by external force ($P_2$) acting on the periphery of the operating cap 6. As a result, a surface area 521' of the deformed contact portion that contacts the dielectric sheet 3 is increased compared to a contact area of the curved bottom surface 521 in FIG. 3, thereby changing the capacitance between the conductive supporting seat 5 and the electrode pattern 12.

Figure 10:
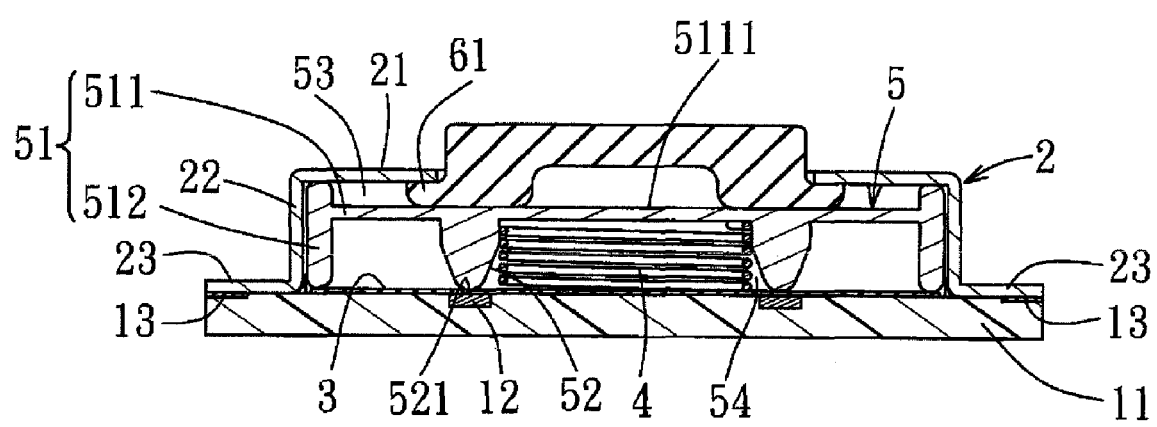
FIG. 10 is a schematic sectional view showing the second preferred embodiment of a variable capacitor according to the present invention.

FIG. 10 illustrates the second preferred embodiment of a variable capacitor according to this invention, which is a modification of the first preferred embodiment. In this embodiment, the ring body 52 cooperates with the top wall 511 of the main body 51 to define a spring-receiving space 54 for receiving the coil spring 4.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A variable capacitor comprising:
a substrate having a top surface;
an electrode pattern formed on said top surface of said substrate;
at least one conductive contact formed on said top surface of said substrate and spaced apart from said electrode pattern;
a dielectric sheet disposed on said top surface of said substrate and covering said electrode pattern;
a resilient conductive supporting seat mounted on said dielectric sheet, said conductive supporting seat having a central portion spaced apart from said dielectric sheet, and a contact portion corresponding to said electrode pattern, said contact portion extending downward from said central portion toward said electrode pattern and abutting against said dielectric sheet;
an insulating operating cap supported by said conductive supporting seat and disposed over said central portion of said conductive supporting seat;
a conductive cover body mounted on said substrate, and covering and electrically contacting said conductive supporting seat, said cover body being connected electrically to said conductive contact, and permitting said operating cap to extend outward; and
a biasing member disposed between said conductive supporting seat and said dielectric sheet for biasing said central portion to move away from said substrate;
wherein, when said operating cap is depressed, said operating cap forces said contact portion of said conductive supporting seat to deform such that a surface area of said deformed contact portion that contacts said dielectric sheet is increased, thereby changing the capacitance between said conductive supporting seat and said electrode pattern.

2. The variable capacitor as claimed in claim 1, wherein said conductive supporting seat is a cap and includes a main body, said main body having a top wall with said central portion, and an annular surrounding wall disposed around said top wall and connected to a periphery of said top wall, said annular surrounding wall being connected electrically to said conductive cover.

3. The variable capacitor as claimed in claim 2, wherein said annular surrounding wall has an upper portion extending upward from said top wall such that said upper portion of said annular surrounding wall cooperates with said top wall to define a receiving space for receiving said operating cap.

4. The variable capacitor as claimed in claim 2, wherein:
said electrode pattern is ring-shaped; and
said contact portion extends downward from said central portion of said top wall, and is in the form of a ring body, said ring body having a vertically tapering cross section in a plane that intersects a center of said ring body.

5. The variable capacitor as claimed in claim 4, wherein said ring body has a curved annular bottom surface.

6. The variable capacitor as claimed in claim 4, wherein said biasing member is a coil spring, and has opposite upper and lower ends abutting respectively against said top wall of said conductive supporting seat and said dielectric sheet.

7. The variable capacitor as claimed in claim 6, wherein said coil spring is sleeved on said ring body.

8. The variable capacitor as claimed in claim 6, wherein said ring body cooperates with said top wall to define a spring-receiving space for receiving said coil spring.

\* \* \* \* \*